United States Patent
Barber et al.

(10) Patent No.: US 9,745,992 B2
(45) Date of Patent: Aug. 29, 2017

(54) TURBOCHARGER BEARING DAMPER ASSEMBLY

(71) Applicant: Honeywell International Inc., Morristown, NJ (US)

(72) Inventors: Timothy Daniel Barber, Litchfield Park, AZ (US); Timothy Hindle, Peoria, AZ (US); Kostandin Gjika, Epinal (FR); Paul Talbert, Phoenix, AZ (US); Ken Young, Morristown, NJ (US); Toren S. Davis, Peoria, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 75 days.

(21) Appl. No.: 14/840,011

(22) Filed: Aug. 30, 2015

(65) Prior Publication Data
US 2017/0058909 A1   Mar. 2, 2017

(51) Int. Cl.
| F16C 27/00 | (2006.01) |
| F04D 29/059 | (2006.01) |
| F16C 39/04 | (2006.01) |
| F16C 19/18 | (2006.01) |
| F16C 33/66 | (2006.01) |
| F01D 25/16 | (2006.01) |
| F16F 15/023 | (2006.01) |
| F16C 27/04 | (2006.01) |

(52) U.S. Cl.
CPC ......... *F04D 29/059* (2013.01); *F01D 25/164* (2013.01); *F16C 19/18* (2013.01); *F16C 19/184* (2013.01); *F16C 27/045* (2013.01); *F16C 33/6637* (2013.01); *F16C 39/04* (2013.01); *F16F 15/0237* (2013.01); *F16C 2360/24* (2013.01)

(58) Field of Classification Search
CPC .............................. F04D 29/059; F16C 27/045
See application file for complete search history.

(56) References Cited

U.S. PATENT DOCUMENTS

| 1,386,255 A | 8/1921 | Hindle et al. |
| 3,053,590 A | 9/1962 | Dison, Jr. |
| 4,213,661 A * | 7/1980 | Marmol ................ F16C 27/045 |
| | | 384/215 |
| 4,668,108 A | 5/1987 | McHugh |

(Continued)

FOREIGN PATENT DOCUMENTS

| CN | 102 338 158 A | 2/2012 |
| DE | 36 28 687 A1 | 2/1988 |

(Continued)

OTHER PUBLICATIONS

San Andres, Notes 13. Squeeze Film Dampers: Operation, Models & Issues, 2010 (22 pages).

(Continued)

*Primary Examiner* — Thomas R. Hannon
(74) *Attorney, Agent, or Firm* — Brian J. Pangrle

(57) ABSTRACT

A turbocharger system can include a housing that includes a bore defined at least in part by a bore wall; a rolling element bearing unit that includes an outer race; and a mixed-element damper assembly disposed at least in part between the outer race and the bore wall where the mixed-element damper assembly includes a lobed-spring element and a squeeze film damper element.

20 Claims, 13 Drawing Sheets

(56) References Cited

U.S. PATENT DOCUMENTS

| | | |
|---|---|---|
| 4,900,165 A | 2/1990 | Kun et al. |
| 4,952,076 A * | 8/1990 | Wiley, III et al. .... F01D 25/164 384/535 |
| 4,992,024 A | 2/1991 | Heydrich |
| 5,246,352 A | 9/1993 | Kawakami |
| 6,062,028 A | 5/2000 | Arnold et al. |
| 6,325,546 B1 | 12/2001 | Storace |
| 6,425,743 B1 | 7/2002 | Fischer |
| 6,630,761 B1 | 10/2003 | Gabrys |
| 6,682,219 B2 | 1/2004 | Alam et al. |
| 7,052,183 B2 | 5/2006 | Chen et al. |
| 7,121,729 B2 | 10/2006 | Davis et al. |
| 7,611,286 B2 | 11/2009 | Swann et al. |
| 7,648,278 B2 | 1/2010 | Stout et al. |
| 8,118,570 B2 | 2/2012 | Meacham et al. |
| 8,734,130 B2 | 5/2014 | Meacham et al. |
| 9,046,001 B2 * | 6/2015 | Hindle et al. ......... F01D 25/164 |
| 9,109,622 B2 | 8/2015 | Meacham et al. |
| 2003/0038006 A1 | 2/2003 | Laos |
| 2006/0083448 A1 | 4/2006 | Alam et al. |
| 2006/0204153 A1 | 9/2006 | Alam et al. |
| 2009/0110572 A1 | 4/2009 | Meacham et al. |
| 2011/0058759 A1 | 3/2011 | Herborth et al. |
| 2011/0171012 A1 | 7/2011 | Vetters et al. |
| 2013/0186105 A1 * | 7/2013 | Meacham et al. ...... F01D 25/28 60/797 |
| 2014/0140645 A1 | 5/2014 | Meacham et al. |

FOREIGN PATENT DOCUMENTS

| | | |
|---|---|---|
| DE | 10 2010 019528 A1 | 10/2011 |
| DE | 10 2010 054937 A1 | 6/2012 |
| JP | H05-33667 A | 2/1993 |
| JP | H09-133029 A | 5/1997 |
| NO | 2013/126231 A1 | 8/2013 |
| WO | 0001935 A1 | 1/2000 |
| WO | 0169047 A1 | 9/2001 |
| WO | 0223047 A1 | 3/2002 |
| WO | 200604654 A1 | 1/2006 |
| WO | 2006004655 A2 | 1/2006 |
| WO | 2006098806 A1 | 9/2006 |
| WO | 2009058349 A2 | 5/2009 |
| WO | 2009058349 A3 | 5/2009 |

OTHER PUBLICATIONS

EP Application No. 16185579.6-1760, Extended European Search Report of Mar. 3, 2017 (8 pages).

* cited by examiner

TURBOCHARGER BEARING DAMPER ASSEMBLY

TECHNICAL FIELD

Subject matter disclosed herein relates generally to turbocharger assemblies.

BACKGROUND

A turbocharger center housing rotating assembly (CHRA) can include a turbine wheel and a compressor wheel attached to a shaft rotatably supported by a ball bearing assembly located in a bore of a center housing. As an example, a ball bearing assembly (e.g., or ball bearing cartridge) can include an outer race and an inner race, configured to receive a shaft, where the outer race and the inner race are separated by balls. As another example, a shaft may be configured as an inner race, for example, where balls directly contact the shaft.

During operation of a turbocharger, axial loads can be generated that thrust the turbocharger shaft and associated components toward the compressor end or toward the turbine end of the turbocharger CHRA. Such loads may, over time, cause wear of one or more surfaces of a ball bearing assembly, which, in turn, may lead to a reduction in performance, failure, etc.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
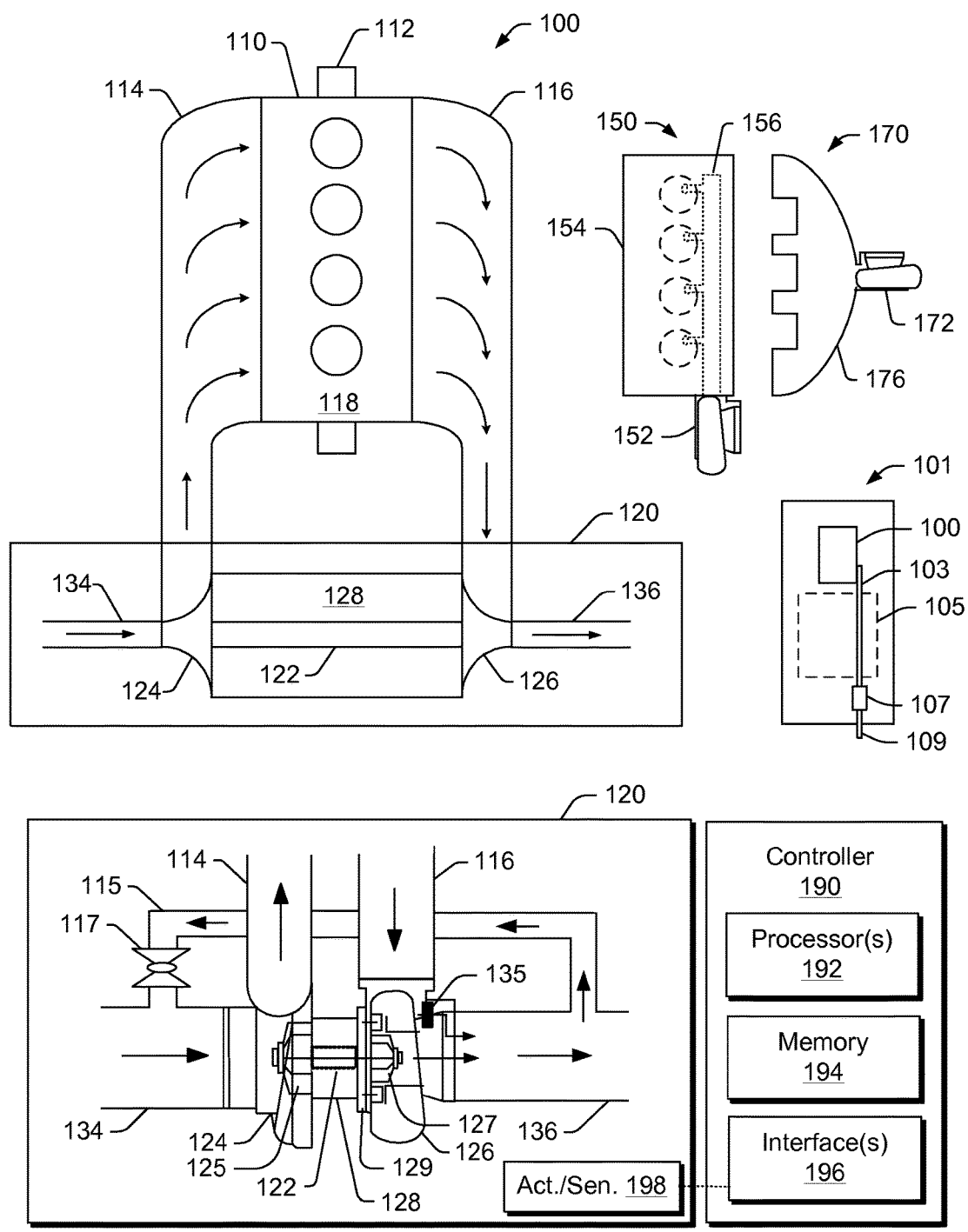
FIG. 1 is a diagram of a turbocharger and an internal combustion engine along with a controller.

During operation of a turbocharger, a ball bearing assembly may be exposed to imbalance forces, thrust forces, etc. Such forces can cause one or more surfaces of a ball bearing assembly to wear, which, in turn, may decrease performance, lead to failure, etc.

One or more balancing processes that aim to minimize imbalance may be performed on components of a turbocharger. For example, individual components may be balanced using a low rotational speed process while assemblies (e.g., center housing rotating assemblies or CHRAs) may be balanced using a higher rotational speed process. However, over the lifetime of a turbocharger, various phenomena can lead to imbalance (e.g., wear, coking, etc.).

As to thrust forces, these may arise during operational transients such as changes in demand, changes in geometry of a variable geometry turbine unit or compressor unit, etc. Operational transients may generate axial thrust forces that accelerate wear as components in a ball bearing assembly come closer together, for example, squeezing out or otherwise thinning lubricant film thickness between such components.

As with most types of machinery, a manufacturer may recommend inspection, servicing, replacement, etc. of a turbocharger, or one or more components therein, based on, for example, hours of use. However, from time-to-time, a turbocharger may fail even though such recommendations have been followed. Unexpected failure of a turbocharger can lead to unplanned downtime of equipment that relies on the turbocharger, which may have associated costs.

As an example, a bearing assembly may form lubricant films, which may act as squeeze films or squeeze film dampers (SFDs). A squeeze film damper may provide viscous damping in a turbocharger. As an example, a squeeze film damper may provide structural isolation, reduce amplitudes of rotor response to imbalance, assist to suppress rotordynamic instability, etc. During operation, hydrodynamic squeeze film pressures can exert reaction forces that can help to attenuate transmitted forces and to reduce component amplitude.

For a particular application, one or more SFDs may be formed that aim to provide a desired amount of damping. Damping may be defined as being large, for example, where a SFD acts as a rigid constraint to a rotor-bearing system (e.g., forces transmitted to supporting structure) or as being light, for example, where it may permit amplitudes of vibratory motion with likely subsynchronous motions. As an example, a SFD may be characterized as being soft, for example, where it allows for motion at a location of a support (e.g., as to one or more modes of vibration of interest).

A SFD may be characterized by various parameters such as, for example, damper geometry (e.g., length, diameter and clearance), operating speed and fluid properties (e.g., density and viscosity). Some factors that may affect performance of a SFD can include kinematics (e.g., as tied to rotor system and acting forces), level of lubricant/fluid supply pressure for adequate flow rate and cooling, feeding and end sealing mechanisms, fluid inertia effects, etc.

As an example, a SFD may be modeled using a mathematical damping model. Such a model may include equations associated with elements. For example, a SFD may be modeled as a viscous element such as a dashpot.

Damping may be described as influencing an oscillatory system to reduce, restrict, and/or prevent oscillations. A system may be characterized with respect to damping, for example, consider overdamped, critically damped, underdamped, or undamped. As an example, a system may be modeled as a mass-spring-damper system with mass m, spring constant k, and viscous damper of damping coefficient c. Such a system may be subjected to an oscillatory force and/or a damping force.

As an example, an assembly can include various elements that are or act as springs. For example, an element may be characterized via one or more spring coefficients (e.g., k or K). As an example, an assembly may be configured to form one or more clearances into which lubricant may flow, for example, to form a viscous element.

As an example, an assembly can include a plurality of lobed springs that may be characterized by a parameter K. For example, consider a first type of lobed spring characterized by $K_A$ and a second type of lobed spring characterized by $K_B$. In such an example, a parameter $C_A$ may be associated with damping as achieved via one or more SFDs. A mathematical model may include a spring element characterized by the parameter $K_A$ and a parallel set of elements arranged in series characterized by the parameters $K_B$ and $C_A$ (e.g., a spring and a dashpot).

As an example, a spring may be characterized by a number of lobes, a length or lengths, a width or widths, a thickness or thicknesses, a material of construction or materials of construction, a diameter or diameters, a mass, etc. As an example, a spring may cooperate with one or more other components, for example, to define at least in part a clearance or clearances, which may be lubricant clearances for film formation (e.g., SFD(s)).

As an example, an assembly may be disposed within a bore of a housing and be fit to an outer race of a rolling element bearing unit (e.g., or units). In such an example, the housing may be part of a turbocharger such as, for example, a center housing or bearing housing of a turbocharger. As an example, a shaft may be supported at least in part via an assembly that includes springs and that forms SFDs. In such an example, the shaft may be fit to an inner race or inner races of a rolling element bearing unit or units. Such a shaft may be part of a "shaft and wheel assembly" (SWA) where the wheel is a turbine wheel (e.g., welded to the shaft) and where a compressor wheel may be fit via a free end of the shaft.

As an example, an assembly may be configured in a manner that allows for altering design of a bearing housing such as, for example, a center housing of a turbocharger. For example, an assembly that include one or more springs (e.g., spring elements) may act to distribute force in a manner that can lessen the structural demands placed on a bore wall, a portion of a bore wall, etc. Where a bearing housing is cast (e.g., metal or alloy) with a bore wall or bore walls, a reduction in mass of the bearing housing may optionally be achieved where an assembly can distribute forces effectively.

Below, an example of a turbocharged engine system is described followed by various examples of components, assemblies, methods, etc.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons). As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor housing 124 for a compressor wheel 125, a turbine housing 126 for a turbine wheel 127, another housing 128 and an exhaust outlet 136. The housing 128 may be referred to as a center housing as it is disposed between the compressor housing 124 and the turbine housing 126. The shaft 122 may be a shaft assembly that includes a variety of components. The shaft 122 may be rotatably supported by a bearing system (e.g., journal bearing(s), rolling element bearing(s), etc.) disposed in the housing 128 (e.g., a bore defined by one or more bore walls) such that rotation of the turbine wheel 127 causes rotation of the compressor wheel 125 (e.g., as rotatably coupled by the shaft 122).

In the example of FIG. 1, a variable geometry assembly 129 is shown as being, in part, disposed between the housing 128 and the housing 126. Such an assembly may include vanes or other components to vary geometry of passages that lead to a turbine wheel space in the turbine housing 126. As an example, a variable geometry compressor unit may be provided.

In the example of FIG. 1, a wastegate valve (or simply wastegate) 135 is positioned proximate to the inlet of the turbine 126. The wastegate valve 135 can be controlled to allow exhaust from the exhaust port 116 to bypass the turbine 126. Further, an exhaust gas recirculation (EGR) conduit 115 may be provided, optionally with one or more valves 117, for example, to allow exhaust to flow to a position upstream the compressor wheel 125.

FIG. 1 also shows an example arrangement 150 for flow of exhaust to an exhaust turbine housing 152 and another example arrangement 170 for flow of exhaust to an exhaust turbine housing 172. In the arrangement 150, a cylinder head 154 includes passages 156 within to direct exhaust from cylinders to the turbine housing 152 while in the arrangement 170, a manifold 176 provides for mounting of the housing 172, for example, without any separate, intermediate length of exhaust piping. In the example arrangements 150 and 170, the turbine housings 152 and 172 may be configured for use with a variable geometry assembly such as the assembly 129 or, for example, other assemblies described herein.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., hours of service, turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate, an electric motor, or one or more other components associated with an engine, a turbocharger (or turbochargers), etc. As an example, the controller 190 may be configured to perform a method associated with a rolling element bearing unit/assembly, for example, a method that can issue a notification responsive to generated noise, vibration, temperature, lubricant flow, etc.

As an example, a system may include one or more actuators and/or one or more sensors 198. In such an example, the interface 196 of the controller 190 may receive signals of one or more sensors and/or transmit signals to one or more actuators. The controller 190 may implement control logic, for example, based at least in part on a signal to output a control signal (e.g., to one or more actuators, notification mechanisms, etc.).

Exhaust driven turbochargers can include a rotating shaft carrying a turbine wheel and a compressor wheel where the shaft may be rotatably supported within a center housing (e.g., intermediate a compressor and a turbine) by one or more lubricated bearings (e.g., oil lubricated). During operation, exhaust from an internal combustion engine can be directed via one or more conduits, passages, etc., to drive a turbocharger's turbine wheel, which, in turn, drives a compressor wheel to boost charge air to the internal combustion engine.

During operation, a turbocharger's rotating assembly may reach rotational speeds in excess of 100,000 rpm (e.g., some may reach rotational speeds of 250,000 rpm or more). To handle such high speeds, a turbocharger's center housing rotating assembly (CHRA) requires balance and adequate lubrication. Factors such as noise, vibration and harshness (NVH), as well as efficiency, are often interrelated and must be within acceptable limits.

As to operational temperatures, consider as an example a diesel engine with exhaust that may be at about 860 degrees C. and consider as an example a gasoline engine with exhaust that may be at about 1050 degrees C. Exhaust gas can cause heating of various components of a CHRA, including bearings, etc., and heat energy may be transferred to lubricant that flows through a CHRA. As an example of interrelatedness, vibration can generate noise and reduce efficiency while heat energy, particularly with respect to cycling, may cause wear, changes to one or more clearances, etc. Heat energy may also act to alter chemical structure of a lubricant, for example, depending on type of lubricant (e.g., consider hydrocarbon coking, etc.). Under dynamic conditions, such as an increase in exhaust flow, axial thrust forces can cause contact between various CHRA components. Contact can cause wear, which, in turn, can alter balance, leading to increased noise, vibration, etc., and reduced efficiency. Factors such as noise, vibration, wear, etc. may lead to failure of one or more components of a turbocharger.

Turbocharger bearing systems may offer both support and damping to control motion of a turbocharger shaft, for example, to help isolate vibrations from rotating parts while allowing the turbocharger shaft to spin, for example, at speeds that may be about 60 times faster than a maximum engine speed (e.g., consider a diesel engine). A turbocharger bearing system may help ensure turbocharger operational efficiency by keeping frictional losses and NVH low such that energy from the engine exhaust gas is available to drive the turbocharger. Where operational conditions may vary, a turbocharger bearing system may be selected to help balance low-power losses with an ability to control forces applied by varying mechanical loading (e.g., thrust and other forces).

As to turbocharger bearing system hydrodynamics, fluid (e.g., oil or other lubricant) may lubricate components and also influence motion of a turbocharger shaft. As an example, a "fully-floating" bearing system can include a journal bearing that supports a shaft using an outer film disposed between a bore wall of a center housing and an outer surface of the journal bearing and an inner film disposed between an inner surface of the journal bearing and an outer surface of the shaft. In such an example, the journal bearing may rotate (azimuthally) at approximately one-half the speed of the shaft and move axially and radially (i.e., the journal bearing is fully-floating).

As to a "semi-floating" approach, an anti-rotation mechanism may act to limit rotation (azimuthally) of a journal bearing or, for example, an outer race of a rotating element bearing (REB) assembly. As an example, a semi-floating journal bearing or a semi-floating REB assembly may support a shaft using, in part, an outer oil film disposed between an outer surface of the journal bearing or an outer surface of the REB assembly and a bore wall of a center housing where the outer oil film acts as a squeeze film (SFD), for example, to damp undesirably shaft motions.

As an example, a turbocharger may include one or more rolling element bearing (REB) assemblies or units, which may be, for example, one or more ball bearing assemblies. An REB assembly can include an outer race, an inner race and rolling elements disposed between the inner and outer races (e.g., in a raceway or raceways). For example, consider an REB assembly that includes a unitary outer race and a two-piece inner race fit to a turbocharger shaft (e.g., a shaft and wheel assembly (SWA) where rolling elements allow for rotation of the shaft and two-piece inner race with respect to the outer race). In such an example, the outer race of the REB assembly may be "located" in a bore of a housing such as a center housing (e.g., disposed between a compressor housing and a turbine housing). As an example, to axially locate an outer race in a bore of a center housing, a counter-bore and a plate may be positioned at a turbine side and a compressor side of the center housing where each forms an opening with a diameter less than an outer diameter of the outer race. In such an example, the REB assembly (e.g., unit or units) may be placed in the bore followed by receipt of a shaft (e.g., a SWA) or, for example, the REB assembly may be fit to the shaft (e.g., a SWA) and then inserted into the bore (e.g., as a unit that includes the REB assembly and the shaft). Further, an anti-rotation mechanism may be provided that locates the outer race in the bore of the center housing by limiting rotation of the outer race (e.g., azimuthal direction). In such an example, the REB assembly may be "semi-floating", for example, having an ability to move in a radial direction where radial clearances between an outer surface of the outer race and a bore surface of the center housing provide for squeeze film formation (e.g., one or more lubricant films).

Figure 2:
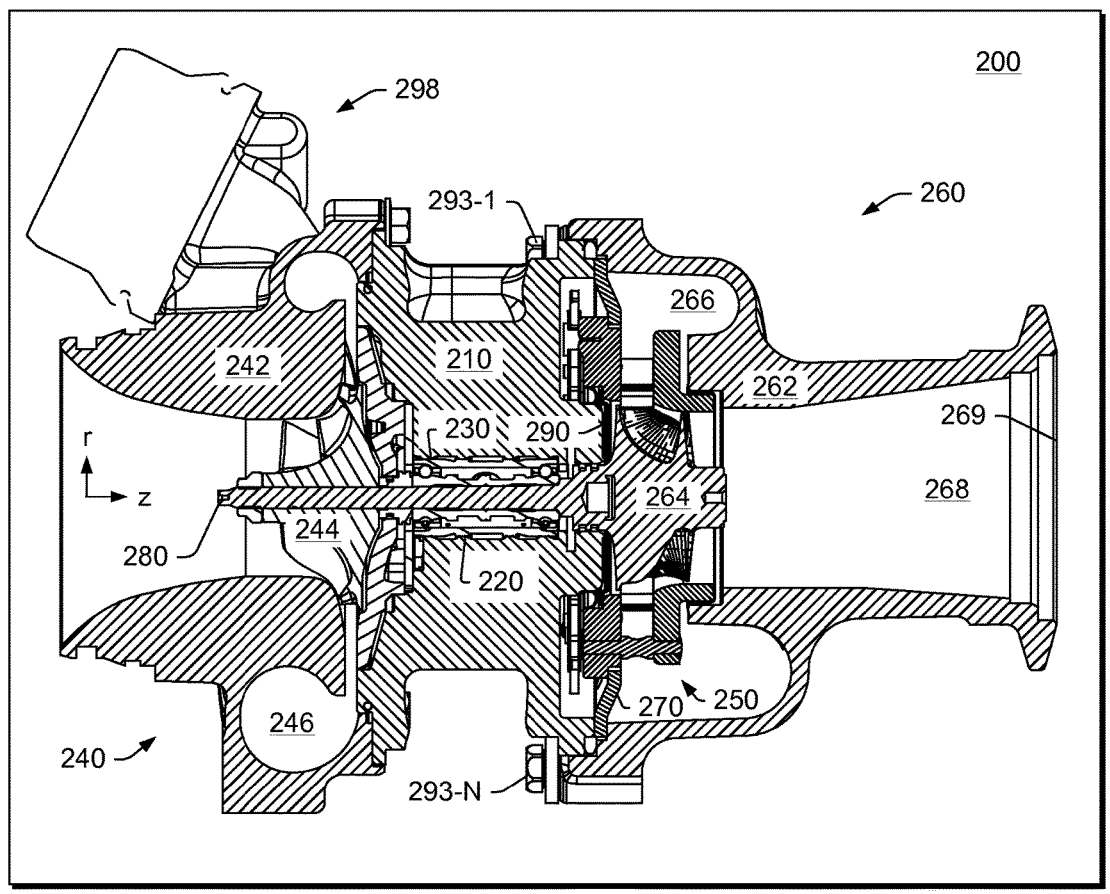
FIG. 2 is a cross-sectional view of an example of a turbocharger assembly.

FIG. 2 shows an example of a turbocharger assembly 200 that includes a ball bearing assembly 220 (e.g., a ball bearing cartridge) disposed in a bore 230 (e.g., a through bore defined by one or more bore walls) of a housing 210 between a compressor assembly 240 and a turbine assembly 260 where the ball bearing assembly 220 supports a shaft 280. In the example of FIG. 2, the compressor assembly 240 includes a compressor housing 242 that defines a volute 246 and that houses a compressor wheel 244 and the turbine assembly 260 includes a turbine housing 262 that defines a volute 266 and that houses a turbine wheel 264. The turbine wheel 264 may be, for example, welded or otherwise attached to the shaft 280 to form a shaft and wheel assembly (SWA) where a free end of the shaft 280 allows for attachment of the compressor wheel 244.

In the example of FIG. 2, the turbine assembly 260 further includes a variable geometry assembly 250 (e.g., a VGT or VNT cartridge or unit) that is positioned using a flange 270 (e.g., optionally shaped as a stepped annular disc) that clamps between the housing 210 and the turbine housing 262, for example, using bolts 293-1 to 293-N and a heat shield 290 (e.g., optionally shaped as a stepped annular disc), the latter of which is disposed between the cartridge 250 and the housing 210.

As to exhaust flow, higher pressure exhaust in the volute 266 passes through passages of the cartridge 250 to reach the turbine wheel 264 as disposed in a turbine wheel space defined by the cartridge 250 and the turbine housing 262. After passing through the turbine wheel space, exhaust travels axially outwardly along a passage 268 defined by a wall of the turbine housing 262 that also defines an opening 269 (e.g., an exhaust outlet). The exhaust may then flow to an exhaust system, which may optionally include one or more emissions components, etc. and then to an external environment (e.g., at atmospheric pressure).

During operation of the turbocharger assembly 200, adjustments to geometry of the variable geometry assembly 250 by an actuator 298 may generate thrust forces, which may, for example, cause shifts in clearances between one or more components. As an example, a test regimen may be performed by adjusting geometry of a variable geometry assembly 250, for example, to cause a shift in clearances, positions, etc. of one or more components of the ball bearing assembly 220. In such an example, the test regimen may test a notification mechanism of the ball bearing assembly 220.

In FIG. 2, as well as in other figures, various components may be described, for example, with respect to a cylindrical coordinate system having radial, axial and azimuthal coordinates r, z and Θ, respectively.

Figure 3:
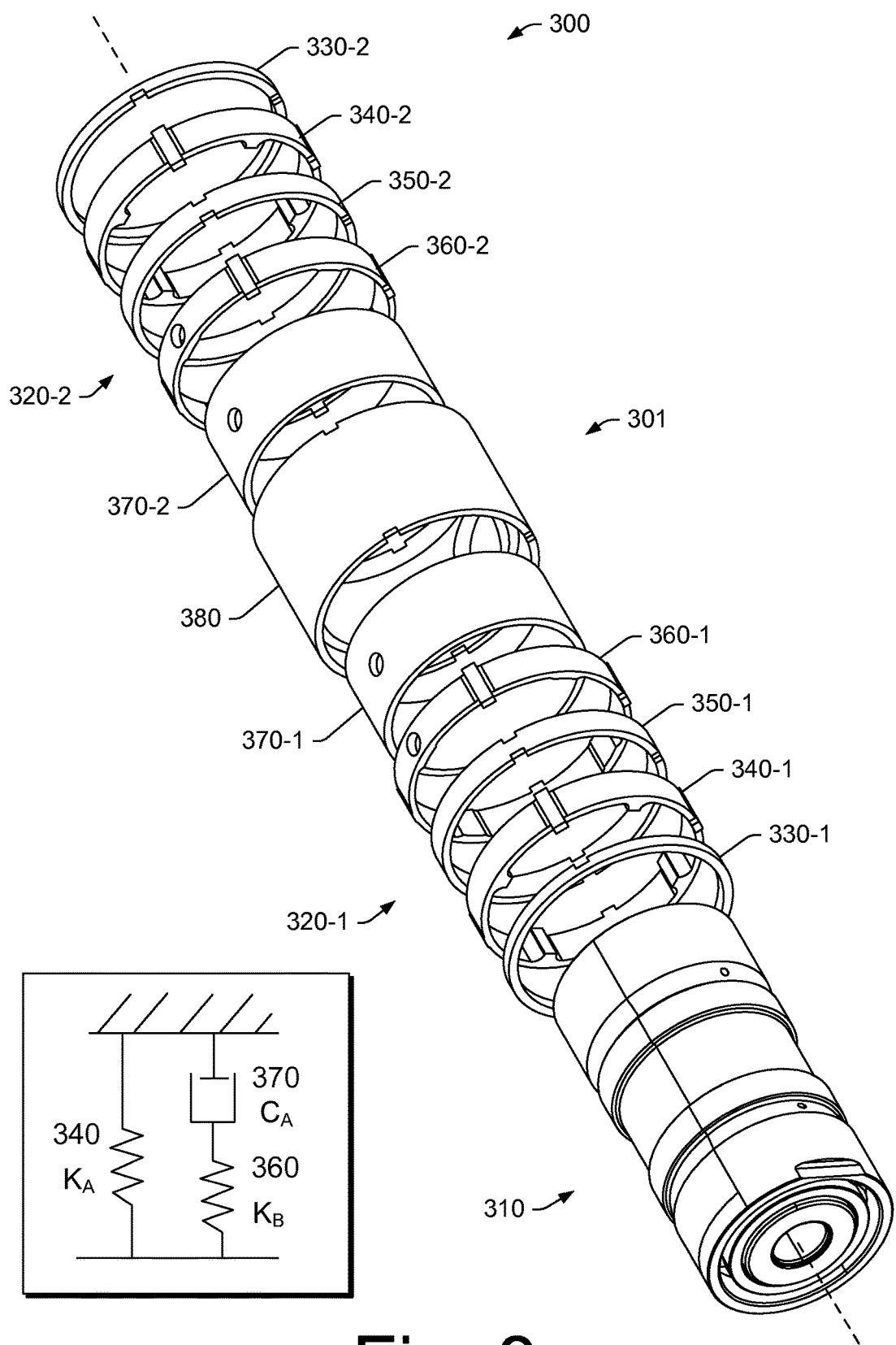
FIG. 3 is an exploded perspective view of an example of an assembly.

FIG. 3 is an exploded perspective view of an example of an assembly 300. As shown, the assembly 300 includes a mixed-element damper assembly 301 and a rolling element bearing unit 310 (e.g., as a cartridge) to which the various components of the mixed-element damper assembly 301 may be fit.

In the example of FIG. 3, the mixed-element damper assembly 301 includes a compressor side sub-assembly 320-1 and a turbine side sub-assembly 320-2 where a middle spacer 380 is disposed at least in part axially between the two sub-assemblies 320-1 and 320-1. As shown, the sub-assembly 320-1 includes an end cap 330-1, a first lobed-spring element 340-1, a spring spacer 350-1, a second lobed-spring element 360-1 and a SFD ring element 370-1; and the sub-assembly 320-2 includes an end cap 330-2, a first lobed-spring element 340-2, a spring spacer 350-2, a second lobed-spring element 360-2 and a SFD ring element 370-2.

FIG. 3 also shows an example of a diagram that includes springs and a dashpot. As shown, the first lobed-spring element 340 may be characterized via a parameter $K_A$ while the second lobed-spring element 360 may be characterized via a parameter $K_B$. In the example diagram, the SFD ring element 370 may be characterized via a parameter $C_A$ (e.g., with respect to one or more SFDs formed at least in part via a surface or surfaces of such an element). In the example of FIG. 3, viscous and mechanical spring damping may be utilized to address motions of a rolling element bearing unit such as, for example, the rolling element bearing unit 310. As an example, values of the parameters may be selected and/or determined to achieve a desired level of performance (e.g., damping, etc.).

As an example, the parameter values for the lobed-spring elements 340 and 360 may differ. For example, $K_B$ may be greater than $K_A$ (e.g., consider an example where $K_B$ is more than about 10% greater than $K_A$). As an example, the parameter $C_A$ may depend on temperature. For example, as $C_A$ pertains to a viscous mechanism, it can depend on how lubricant viscosity changes with temperature. In such an example, where lubricant viscosity decreases with temperature, $C_A$ may also decrease with temperature.

As an example, the SFD ring element 370 may act in series with respect to the lobed-spring element 360. In such an example, the lobed-spring element 340 may act in parallel to the in series elements 360 and 370.

Figure 4:
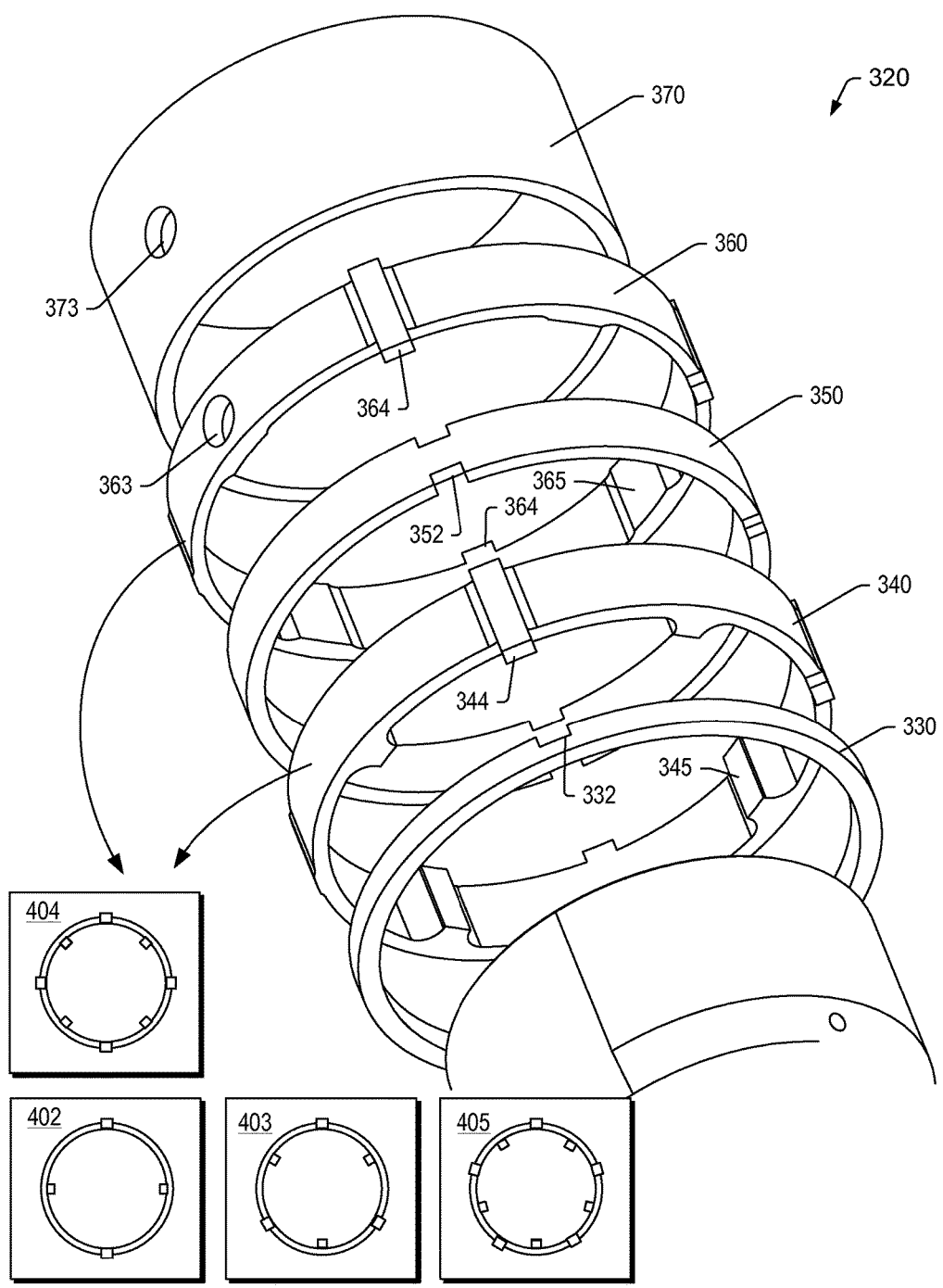
FIG. 4 is an exploded perspective view of a portion of the assembly of FIG. 3.

FIG. 4 shows a perspective view of the sub-assembly 320 that includes the end cap 330, the first lobed-spring element 340, the spring spacer 350, the second lobed-spring element 360 and the SFD ring element 370.

As to the end cap 330, it can include mating features such as one or more keyways 332 (e.g., one or more notches, etc.). As an example, an end cap may include one or more keys and/or one or more keyways. Such mating feature or features can cooperate with a mating feature or features of an adjacent component such as, for example, the lobed-spring element 340.

As to the first lobed-spring element 340, it can include a plurality of radially outwardly extending lobes 344 and can include a plurality of radially inwardly extending lobes 345. Some examples are shown in inset plan views 402, 403, 404 and 405, each of which show a lobed-spring element with a plurality of radially outwardly extending lobes and a plurality of radially inwardly extending lobes. For example, consider the example 402 that includes two lobes oriented to an inward side (e.g., spaced about 180 degrees apart) and two lobes oriented to an outward side (e.g., spaced about 180 degrees apart and offset by about 90 degrees from the other lobes), consider the example 403 that includes three lobes oriented to an inward side (e.g., spaced about 120 degrees apart) and three lobes oriented to an outward side (e.g., spaced about 120 degrees apart and offset by about 60 degrees from the other lobes), consider the example 404 that includes four lobes oriented to an inward side (e.g., spaced about 90 degrees apart) and four lobes oriented to an outward side (e.g., spaced about 90 degrees apart and offset by about 45 degrees from the other lobes) and consider the example 405 that includes five lobes oriented to an inward side (e.g., spaced about 72 degrees apart) and five lobes oriented to an outward side (e.g., spaced about 72 degrees apart and offset by about 36 degrees from the other lobes).

As shown, spacing can determine arc lengths of a lobed-spring element where at least a portion of an arc length may be resilient (e.g., based on material of construction, thickness(es), axial width(s) or length(s), arc length(s), etc.). As an example, a lobe may be located at an approximate mid-way point between two other lobes, which may be inward facing or outward facing lobes. Such an arrangement may be considered as including symmetry with respect to, for example, inward and outward lobes. As an example, an arrangement may be offset from such symmetry and may be considered to be asymmetric. For example, consider one or more offsets that differ from one half of a number of degrees of spacing of lobes (e.g., 90 degree spacing of outer lobes with about 30 degrees offset to one side with respect to an inner lobe and about 60 degrees offset to another side with respect to an inner lobe). As an example, asymmetry may optionally be imparted by features of one or more arc lengths (e.g., arc spans or bridges between lobes).

In the example of FIG. 4, the plurality of radially outwardly extending lobes 344 of the lobed-spring element 340 further form keys that extend axially outwardly, for example, to be received by respective keyways, which can act to orient the lobed-spring element 340 with respect to one or more other components (e.g., whether adjacent or not, via direct or indirect coupling, respectively). As an example, a key may extend axially toward a compressor side direction or extend axially toward a turbine side direction. As an example, a lobe may include a key or keys.

As an example, a lobed-spring element may include one or more keys and/or one or more keyways. Such an approach as to one or more keys may act to extend the surface area of one or more lobes and/or to stabilize the one or more keys (e.g., with respect to a keyway). For example, where a key is a portion of a lobe and the lobe contacts a bore wall, the lobe may be relatively stable compared to an arc span that is resilient (e.g., that can move radially inwardly and/or outwardly as a spring). As an example, a keyway may be part of a relatively "neutral" component (e.g., a spring spacer) that may not include lobes (e.g., lobes extending outwardly or inwardly). As an example, a spring spacer may include one or more lobes.

As to the spring spacer 350, as mentioned, a spring spacer can include one or more mating features such as one or more keyways 352. As an example, a spring spacer may include one or more keys and/or one or more keyways. Such mating feature or features can cooperate with a mating feature or features of an adjacent component or components such as, for example, the lobed-spring element 340 and the lobed-spring element 360.

As to the second lobed-spring element 360, it can include a plurality of radially outwardly extending lobes 364 and can include a plurality of radially inwardly extending lobes 365 (see also, e.g., the views 402, 403, 404 and 405). In the example of FIG. 4, the plurality of radially outwardly extending lobes 364 of the lobed-spring element 360 further form keys that extend axially outwardly, for example, to be received by respective keyways, which can act to orient the lobed-spring element 360 with respect to one or more other components (e.g., whether adjacent or not, via direct or indirect coupling, respectively). As an example, a lobed-spring element may include one or more keys and/or one or more keyways. In the example of FIG. 4, the lobed-spring element 360 also includes one or more lubricant openings 363. As an example, a radially inwardly extending lobe 365 of the lobed-spring element 360 may include a lubricant opening therethrough, for example, one of the lubricant openings 363 may pass through a lobe 365.

As to the SFD ring element 370, it can include a lubricant opening 373. As shown in the example of FIG. 4, the SFD ring element 370 can include an axial length (e.g., along a z-axis) that exceeds that of one or more other components. For example, the axial length of the SFD ring element 370 exceeds the axial length of the lobed-spring element 360.

Upon assembly, the various keyways may receive corresponding keys and, for example, the lubricant opening 373 of the SFD ring element 370 may be substantially aligned with the lubricant opening 363 of the second lobed-spring element 360. For example, an outer diameter of the SFD ring element 370 can be less than an inner diameter of the second lobed-spring element 360 such that the lubricant openings 363 and 373 may be sufficiently aligned for lubricant flow there-through. In such an example, the radially inwardly facing lobes 365 may contact an outer surface of the SFD ring element 370. For example, the lobed-spring element 340 may contact an outer surface of an outer race of a rolling element bearing unit while the lobed-spring element 360 may contact the SFD ring element 370 as the SFD ring element 370 may be radially between the lobed-spring element 360 and an outer surface of an outer race of a rolling element bearing unit.

As to the shape and number of the mating features, these may optionally be varied. For example, a component may include at least one keyway, at least one key or at least one keyway and at least one key. As an example, an assembly can include a number of key/keyway pairs.

Figure 5:
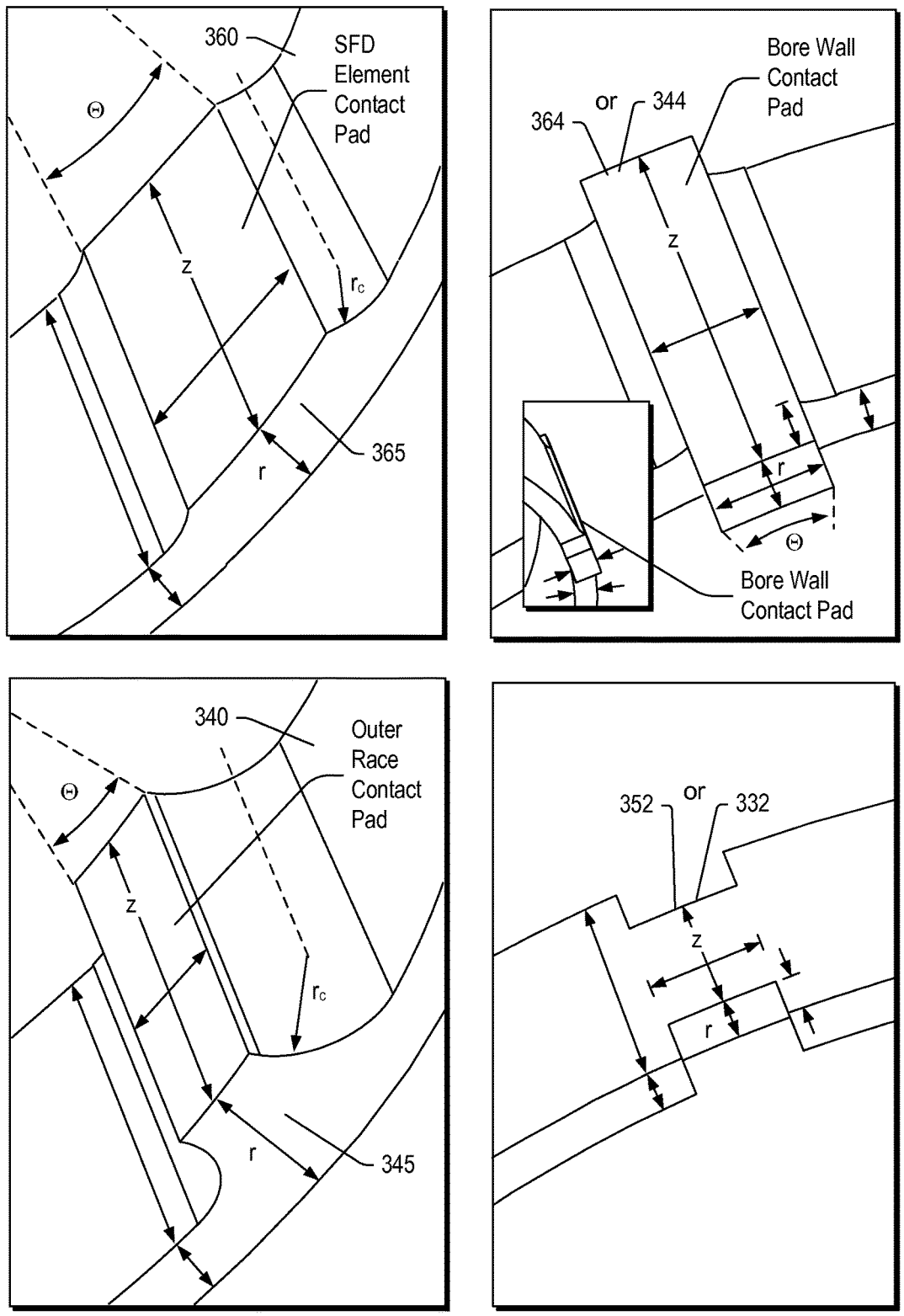
FIG. 5 is a series of perspective views of examples of lobes.

FIG. 5 shows a perspective view of the lobe 345 of the lobed-spring element 340, a perspective view of the lobe 365 of the lobed-spring element 360, a perspective view of the lobe 344 of the lobed-spring element 340 or the lobe 364 of the lobed-spring element 360, and a perspective view of the keyway 332 of the end cap 330 or the keyway 352 of the spring spacer 350. Various dimensions are shown in FIG. 5 including a lobed-spring element thickness (e.g., a radial thickness), a lobe thickness (e.g., a radial thickness), a key thickness (e.g., a radial thickness), a keyway thickness (e.g., a radial thickness), a lobed-spring element width (e.g., an axial width), a lobe width (e.g., an axial width), a key width (e.g., an axial width), a keyway width (e.g., an axial width), a lobe azimuthal span (e.g., as an angle and/or as an arc span), a key azimuthal span (e.g., as an angle and/or as an arc span), a keyway azimuthal span (e.g., as an angle and/or as an arc span), transition portion curvature (e.g., as a radius or radii of curvature), etc.

As shown in the examples of FIG. 5, the radially inwardly extending lobe 345 can differ from the radially inwardly extending lobe 365 in that the lobe 345 is thicker (radially) and narrower (azimuthally). One or more of such differences may account for the SFD element 370 being disposed between the lobe 365 and an outer surface of an outer race. As an example, the radially outwardly extending lobes 345 and 364 may be the same or differ with respect to shape, dimension(s), etc.

As shown, a lobe can include a radial thickness such that it extends radially away from a surface of a lobed-spring element. In such an example, the lobe can include a contact surface as a radially outwardly facing surface, for example, to contact a surface of a bore wall (e.g., a bore wall of a bearing housing such as a turbocharger center housing). As an example, a radially inwardly facing surface may, for example, contact an outer surface of an outer race of a rolling element bearing unit (e.g., cartridge, assembly, etc.) or contact an outer surface of an element such as, for example, the SFD element 370. As an example, the material of construction or materials of construction of the lobed-spring elements 340 and 360 may differ and/or may be the same. As an example, a contact surface may be referred to as a pad, for example, as shown in the examples FIG. 5.

As an example, a lobe such as one of the lobes 344 and 364 may include a key or keys. For example, consider a radially outwardly extending lobe and an axially extending key at one end and optionally another axially extending key at another, opposing end. In the example of FIG. 5, two perspective views of the lobe 344 or the lobe 364 are shown where the radial thickness of the lobe/key is greater than the radial thickness of an adjacent portion of the lobed-spring element 340 or 360. As an example, a lobed-spring element may include at least one keyway and/or at least one key and at least one radially outwardly extending lobe. Various features may be, for example, at different locations on a lobed-spring element (e.g., azimuthally).

As an example, a lobed-spring element can include radially inwardly extending lobes and radially outwardly extending lobes. As illustrated in FIG. 4, these may be offset from each other azimuthally on a lobed-spring element (see, e.g., the elements 340 and 360). As an example, a lobed-spring element can include two or more radially inwardly extending lobes and two or more radially outwardly extending lobes (see, e.g., the views 402, 403, 404 and 405).

In the example of FIG. 4, four radially inwardly extending lobes are set at approximately 90 degree intervals and four radially outwardly extending lobes are set at approximately 90 degree intervals, which are offset by approximately 45 degrees from the four radially inwardly extending lobes. In such an example, a 90 degree arc span includes two lobe contacts to one side and one lobe contact to an opposing side where flexing of the arc span may occur due to forces applied via the contacts. In such an example, resiliency of the material of construction (e.g., or materials of construction) may be characterized at least in part by a parameter such as, for example, a spring constant parameter (e.g., k or K). Such a parameter may be utilized in a mathematical representation of a lobed-spring element, for example, in a model that may include at least one spring element and at least one viscous element (e.g., spring and dashpot model).

As an example, an assembly may include one or more lobed-spring elements. Where an assembly includes a plurality of lobed-spring elements, two or more may be the same or all of them may differ. As mentioned, features of an assembly may be selected based on one or more factors, which may include one or more operational factors (e.g., lubricant, rotational speed, mass, forces, etc.).

Figure 6:
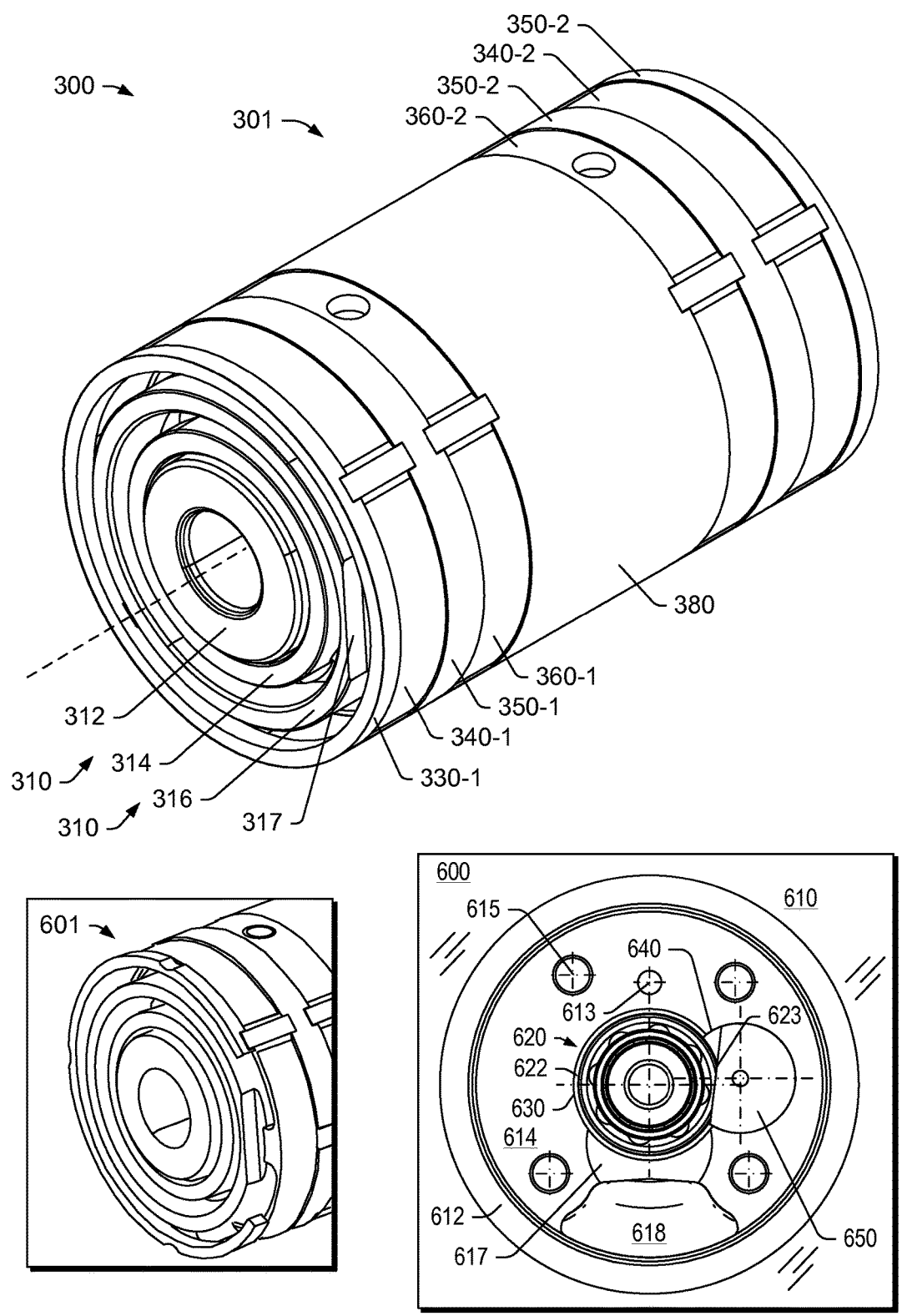
FIG. 6 is a perspective view of the assembly of FIG. 3 and an end view of a portion of a bearing housing assembly.

FIG. 6 shows a perspective view of the assembly 300 of FIG. 3 and an end view of a portion of a bearing housing assembly 600 and an example of the assembly 300 with a modified end portion 601. In the example of FIG. 6, the rolling element bearing unit 310 includes an inner race 312, a rolling element cage 314 and an outer race 316 that can optionally include a locating feature 317, which may, for example, as a keyway, act in conjunction with a key to limit rotation of an outer race of the rolling element bearing unit 310 when disposed in a bore. As an example, an outer race may be capable of azimuthal rotation by a number of degrees. For example, a locating feature may act to limit rotation clockwise and counter-clockwise by about a number of degrees (e.g., less than about 10 degrees). In such an example, some movement radially may be allowed (e.g., for purposes of one or more squeeze films, etc.).

In the example of FIG. 6, the lobed-spring elements 340-1, 360-1, 340-2 and 360-2 can extend radially outwardly via their respective radially outwardly extending lobes. In such an example, these lobes may act to "brace" the assembly 300 in a bore of a bearing housing (e.g., optionally apply a load or "preload" force or forces). Depending on the amount of force applied, the assembly 301 as fit to the rolling element bearing unit 310 may act to limit azimuthal rotation of an outer race of the rolling element bearing unit 310 with respect to a bore of a bearing housing. Such an approach may further act to resist rotation (e.g., to apply a force that counteracts rotation force), which may act to extend longevity of a locating feature or locating features (e.g., reduce wear, etc.).

As shown in the example of FIG. 6, a bearing assembly 620 is seated in a bore 630 of a bearing housing 610 where the bore 630 extends along a bore axis from a compressor end to a turbine end of the housing 610. The housing 610 includes various passages for communication of lubricant to lubricate the bearing assembly 620 and, for example, to lubricate various components that may be attached to or positioned adjacent to the compressor end of housing 610.

At the compressor end, the housing 610 includes an annular face 612 surrounding a recessed surface 614, which includes a lubricant opening 613 for communication of lubricant to the compressor end of the housing 610 (e.g., which may optionally be sealed at the compressor end), openings 615 for bolts or other attachment mechanism (e.g., for attachment of a compressor back plate or other component to the housing 610) and a lubricant drainage recess 617 that leads to a lubricant drain 618. As shown, the bore 630 forms an opening in the recessed surface 614 that, along a lower portion, extends to the lubricant drainage recess 617. With the bearing assembly 620 positioned in the bore 630, lubricant may flow within the bearing assembly 620 and about the bearing assembly 620 and the bore 630 and, for example, to the lubricant drainage recess 617 and to the lubricant drain 618. Lubricant may be pressurized and provided to the housing assembly 600, for example, via a conduit in fluid communication with a lubricant pump (e.g., an oil pump).

In the example of FIG. 6, the housing 610 includes a recess 640 for seating a locating washer 650 which can interact with an outer race 622 of the bearing assembly 620 as positioned in the bore 630 of the housing 610, for example, the outer race 622 can include a locating feature 623 (see also, e.g., the locating feature 317 of the outer race 316). As an example, the locating washer 650 may be a key and the locating feature 623 may be a keyway. In the example of FIG. 6, the recess 640 is positioned to one side of the bore 630 where it may be in fluid communication with the lubricant drainage recess 617. As an example, during operation, some lubricant may flow to the recess 640 and lubricate one or more surfaces of the recess 640 and one or more surfaces of a locating washer 650 seated in the recess 640. In such a manner, the locating washer 650 may rotate with diminished frictional force (e.g., with respect to one or more surfaces of the recess 640).

In the example of FIG. 6, the bearing assembly 620 may be an assembly such as the assembly 300, for example, where the locating feature 317 (e.g., a keyway) of the outer race 316 can interact with the locating washer 650 (e.g., a key). For example, in the modified assembly 601, various features may be truncated for key-keyway interaction. As mentioned, the lobed-spring elements may alter dynamics of rotation of an outer race with respect to a bore of a bearing housing (e.g., a center housing). As an example, a keyway may be accessible for interaction with a locating feature such as the locating washer 650. For example, an end cap may be axially inset and/or include a cutout portion such that a locating feature such as a key can interact with a keyway of an outer race.

Figure 7:
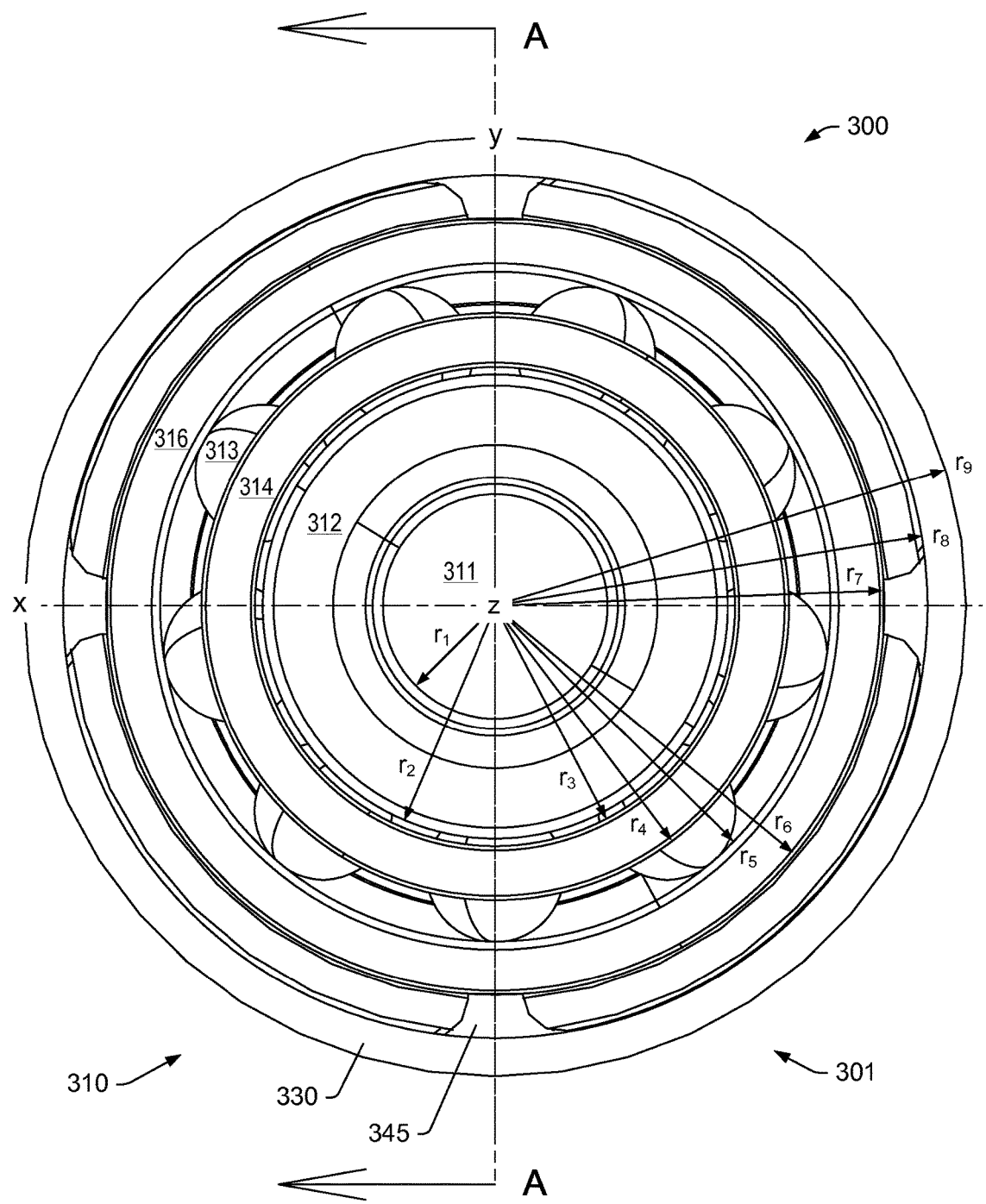
FIG. 7 is an end view of the assembly of FIG. 6.

FIG. 7 shows an end view of a portion of the assembly 300 of FIG. 6. In the view of FIG. 7, four radially inwardly extending lobes 345 of the lobed-spring element 340 are shown. Also shown in FIG. 7 are rolling elements 313 disposed between the inner race 312 and the outer race 316 where the rolling elements 313 are received by the cage 314. As shown in FIG. 7, the radially inwardly extending lobes 345 can contact the outer race 316, for example, orthogonally at about 0, 90, 180 and 270 degrees. For example, given an x,y-plane, two lobes may be along a y-axis and two lobes may be along an x-axis. As an example, one of these axes may optionally be aligned with respect to gravity when a turbocharger is installed in a vehicle or other equipment.

As an example, a lobed-spring element and/or other component may be asymmetric with respect to directions. For example, a lobed-spring element may include larger lobes (e.g., larger pads) and smaller lobes (e.g., smaller pads). In such an example, a difference in lobe size may result in a lobed-spring element including a spring parameter in one direction (e.g., x-direction) that differs from a spring parameter in another direction (e.g., y-direction). As an example, a lobed-spring element may include one or more radial thicknesses along an arc span or arc spans. For example, a lobed-spring element may include a thinner arc span between two lobes and a thicker arc span between two lobes. In such an example, consider a lobed-spring element with four radially inwardly extending lobes that includes two thin arc spans interposed between two thick arc spans (e.g., to provide for directional asymmetry). As an example, a lobed-spring element may optionally be characterized by two or more spring parameters, for example, based on lobe and/or arc span dimensions, etc. As an example, radial thickness and/or axial length (e.g., or axial width) of one or more arc spans of a lobed-spring element may be dimensioned to achieve symmetry or dimensioned to achieve some amount of asymmetry. For example, an approach may act to lessen the amount of material over an azimuthal span, which, in turn, may act to make that azimuthal span more flexible (e.g., compared to a span with more material).

FIG. 7 also shows various radii, $r_1$ to $r_9$ and a z-axis, for example, to define a cylindrical coordinate system (r, z, Θ) where azimuthal angles can define lobe positions.

As mentioned, for the lobed-spring element 360, the radially inwardly extending lobes 365 may contact an element such as the SFD element 370. In such an example, the lobes 365 may act to alter dynamics of the SFD element 370, which, in turn, may alter one or more clearances for one or more squeeze film dampers (e.g., formed by lubricant in one or more clearances).

As an example, depending on spring characteristics, the influence of gravity may or may not be considered negligible. For example, stiffness of lobed-spring elements and/or orientation thereof may or may not allow for settling of a rotating assembly when at rest (e.g., without lubricant pressure to build-up one or more SFDs). As an example, one or more lobed-spring elements may reduce the amount of settling (e.g., in a direction of gravity) that occurs for a rotating assembly (e.g., shaft and wheels).

Figure 8:
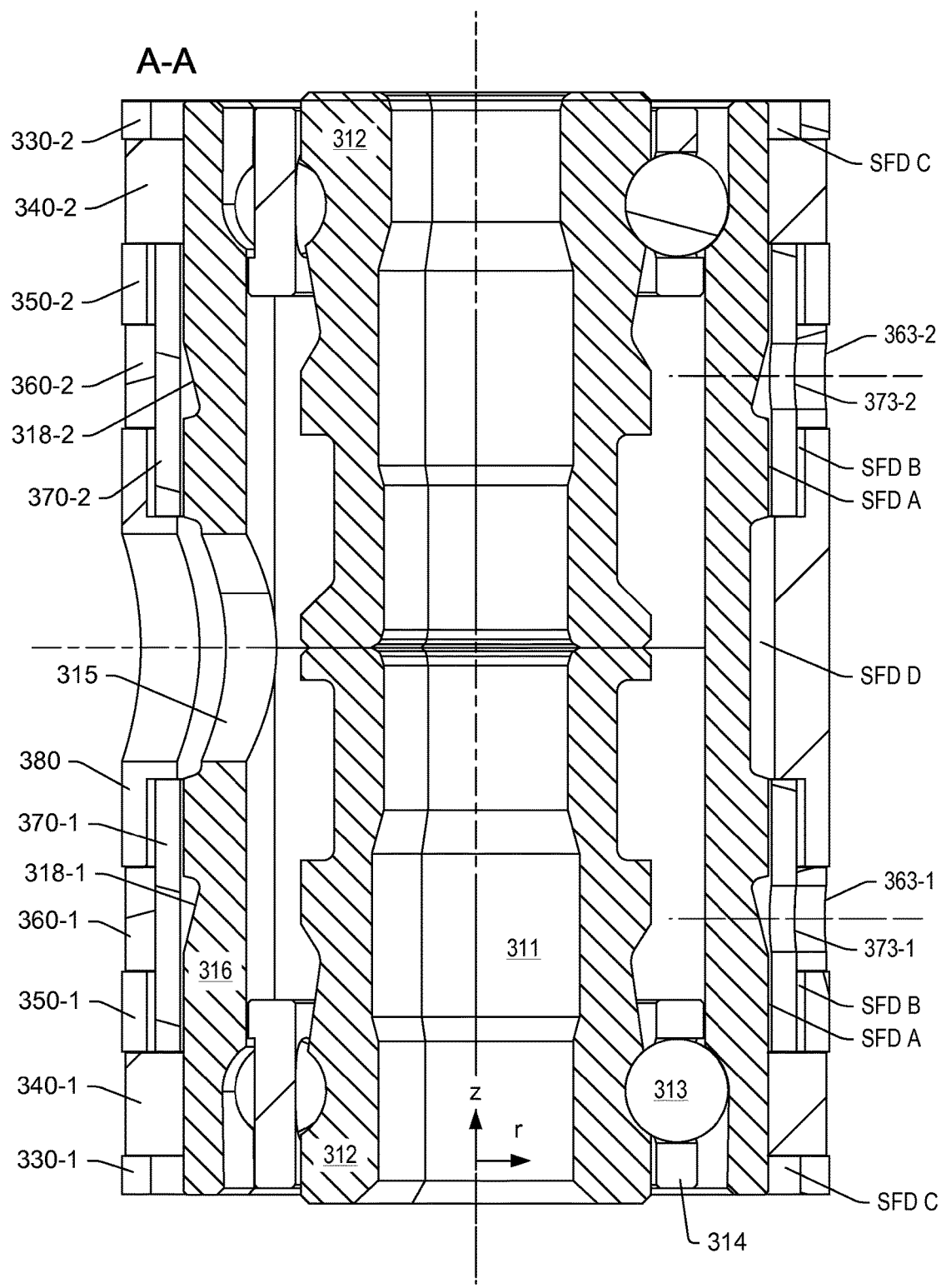
FIG. 8 is a cross-sectional view of the assembly of FIG. 6.

FIG. 8 is a cross-sectional view of the assembly 300 of FIG. 6 along a line A-A as shown in FIG. 7. As shown in the example of FIG. 8, the inner race 312 may be a multi-part inner race (e.g., a compressor side part and a turbine side part) and the outer race 316 may be a unitary outer race (e.g., a single integral piece). As to the outer race 316, it can include a lubricant opening 315 (e.g., a lubricant drain) and lubricant wells 318-1 and 318-2, which may be annular grooves set into the outer surface of the outer race 316. Such wells may be in fluid communication with lubricant openings (see, e.g., FIG. 9) such that lubricant jets may be formed where lubricant can flow from a well through one or more openings and "jet" towards rolling elements such as the rolling elements 313 to lubricant surfaces thereof (e.g., as well as cage surfaces, inner race surfaces and outer race surfaces).

The cross-sectional view of FIG. 8 shows how various components may be positioned with respect to each other, both axially and radially. Such an approach can include defining clearances that may, in turn, define surfaces that contain one or more lubricant films that may act as one or more squeeze film dampers (SFDs). As an example, lobes of the lobed-spring element 340-1 or 340-2 may be axially disposed to overlap at least in part with raceways of the outer race 316, for example, to overlap at least in part with the rolling elements 313.

As shown in the example of FIG. 8, the opening 373-1 of the SFD ring element 370-1 is at least partially aligned with the opening 363-1 of the lobed-spring element 360-1 and the opening 373-2 of the SFD ring element 370-2 is at least partially aligned with the opening 363-2 of the lobed-spring element 360-2. Such alignment can allow for flow of lubricant to the lubricant wells 318-1 and 318-2, respectively.

As an example, a clearance may be defined between an outer surface of the outer race 316 and an inner surface of the SFD ring element 370-1 and a clearance may be defined between an outer surface of the outer race 316 and an inner surface of the SFD ring element 370-2. Such clearances may receive lubricant, which may be pressurized via a supply pressure that is communicated via the at least partially aligned openings 363-1 and 373-1 and the at least partially aligned openings 363-2 and 373-2, respectively. In the example of FIG. 8, these clearances are labeled SFD A, for example, as squeeze film damper type A.

FIG. 8 also shows other clearances that are labeled SFD B, SFD C and SFD D, as these clearances may provide for formation of squeeze film dampers (SFDs).

The type SFD B is defined at least in part by an inner surface of the spring spacer 350-1 and an outer surface of the SFD ring element 370-1 and defined at least in part by an inner surface of the spacer 380 and an outer surface of the SFD ring element 370-1 and at least in part by an inner surface the spring spacer 350-2 and an outer surface the SFD ring element 370-2 and define at least in part by an inner surface of the spacer 380 and an outer surface of the SFD ring element 370-2.

The type SFD C is defined at least in part by an outer surface of the outer race 316 and an inner surface of the end cap 330-1 and at least in part by an outer surface of the outer race 316 and an inner surface the end cap 330-2.

Figure 9:
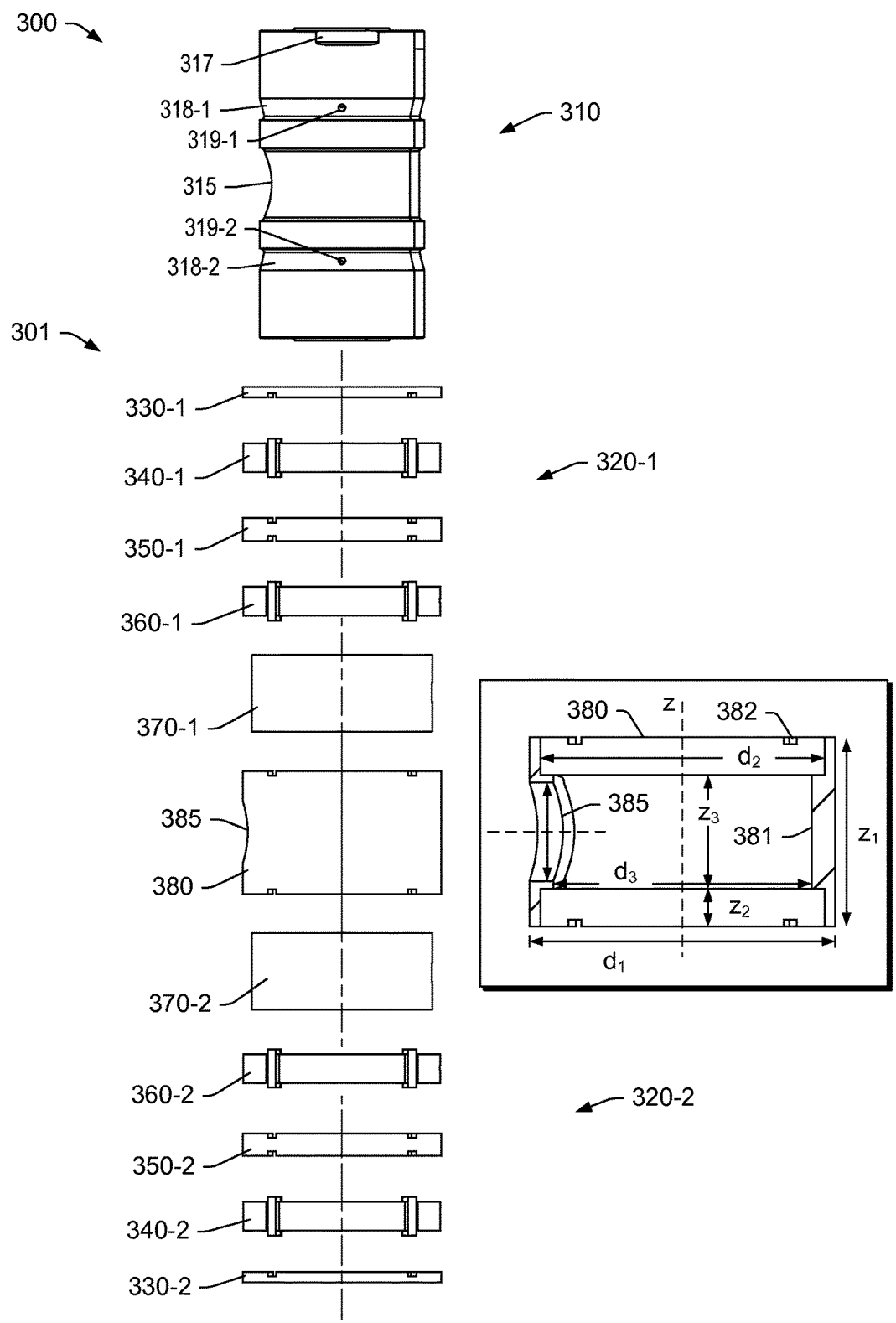
FIG. 9 is an exploded plan view of the assembly of FIG. 3.

The type SFD D is defined at least in part by an outer surface of the outer race 316 (e.g., optionally a recessed surface, recessed from a maximum outer radius of the outer race 316) and an inner surface of the spacer 380 (e.g., a middle spacer, see also cross-sectional view of the spacer 380 of FIG. 9). As an example, various surfaces may be defined by respective radii and/or axial dimensions. As an example, in terms of lubricant pressure, the SFD A types may be of higher pressure than the lubricant pressure of the SFD B, SFD C and SFD D types (e.g., as the SFD A types may be in fluid communication with respective lubricant supply ports via the lubricant openings 363 and 373).

FIG. 9 shows an exploded plan view of the assembly 300 of FIG. 3. In the example of FIG. 9, various features of the rolling element bearing unit 310 are shown including the lubricant opening 315, the optional keyway 317, the lubricant wells 318-1 and 318-2 and lubricant openings 319-1 and 319-2 as disposed in surfaces of the wells 318-1 and 318-2. The lubricant openings 319-1 and 319-2 are passages that extend through the outer race 316 (e.g., from an outer surface of the outer race 316 to an inner surface of the outer race 316).

Also shown in FIG. 9, are an inset portion 381, keyways 382 and an opening 385 of the spacer 380 (e.g., a middle spacer). Such an opening may be aligned with the lubricant opening 315 of the rolling element bearing unit 310. As to the inset portion 381, it includes a radial thickness that exceeds a radial thickness of end portions of the spacer 380. As to the keyways 382, these may receive respective keys of a lobed-spring element such as, for example, keys 364 of the lobed-spring element 360. Various dimensions are also shown with respect to the spacer 380, which include radii or diameters (e.g., $d_1$, $d_2$ and $d_3$) and axial dimensions (e.g., $z_1$, $z_2$ and $z_3$).

Figure 10:
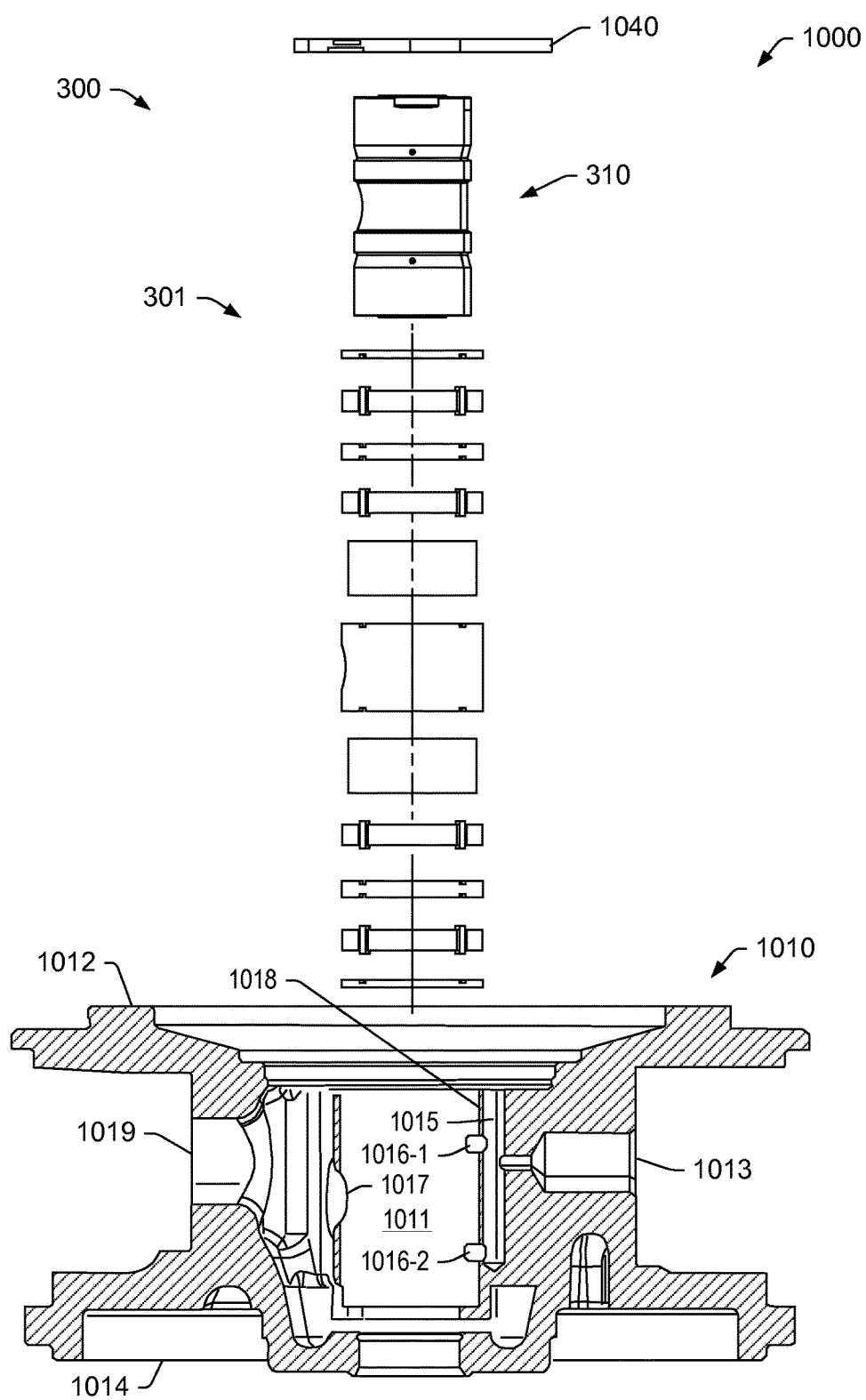
FIG. 10 is a view of an example of a system.

FIG. 10 is a view of an example of a system 1000 that includes the assembly 300, a housing 1010 and an end plate 1040. As an example, the end plate 1040 may be shaped to mate to a housing such as the housing 610 of FIG. 6 (e.g., via bolts, etc., received via the openings 615). In such an example, the end plate 1040 may seat adjacent to the recessed surface 614, for example, at least in part to cover a locating feature such as the locating washer 650, where such a locating mechanism may be included as part of a turbocharger. As an example, the end plate 1040 may act to plug a lubricant passage of a housing, optionally via one or more seal components (e.g., O-ring, plug, etc.).

In the example of FIG. 10, the housing 1010 (e.g., a bearing housing or center housing) includes a compressor side 1012 and a turbine side 1014 and a lubricant inlet 1013 and a lubricant outlet 1019 disposed between the sides 1012 and 1014 where the inlet 1013 and the outlet 1019 may optionally be opposite each other. As an example, at least the outlet 1019 may optionally be substantially aligned with respect to gravity, for example, to allow for drainage of lubricant therefrom at least in part due to gravity.

The housing 1010 also includes a bore 1011 with ports 1016-1 and 1016-2 that are in fluid communication with a passage 1015 that is in fluid communication with the inlet 1013. Such a passage may be akin to a passage associated with the lubricant opening 613 of the housing 610 of FIG. 6 and the passage 1015 may optionally be sealed at the compressor side 1012 (e.g., via a plug, a plate, etc.). Such a passage may be drilled or otherwise formed in a housing, for example, by drilling into a housing from a compressor side to an appropriate axial depth.

In the example of FIG. 10, the bore 1011 is defined at least in part by a bore wall 1018, which includes a radial thickness between the passage 1015 and the bore 1011 and a radial thickness between the bore 1011 and a drainage chamber that is in fluid communication with the outlet 1019 where an opening 1017 in the bore wall 1018 allows for passage of lubricant and where lubricant may also pass, for example, at a compressor end and/or at a turbine end of the bore wall 1018.

As shown in the example of FIG. 10, the ports 1016-1 and 1016-2 are formed in the bore wall 1018 and may be defined at least in part by an azimuthal span (e.g., in degrees) and an axial dimension. For example, a port may span an arc of about a few degrees to about 10 degrees or more. As an example, an axial dimension may be determined at least in part with respect to a lubricant opening such as one of the lubricant openings 363-1, 363-2, 373-1 and 373-2, which can receive lubricant from a respective port 1016-1 and 1016-2. Dimensions of various features may be determined, for example, based at least in part on lubricant pressure and/or one or more other lubricant properties (e.g., viscosity, etc.). As an example, dimensions of various features may be determined based at least in part on one or more analyses of operational conditions (e.g., amount of damping desired, balance between spring and viscous effects, etc.).

Figure 11:
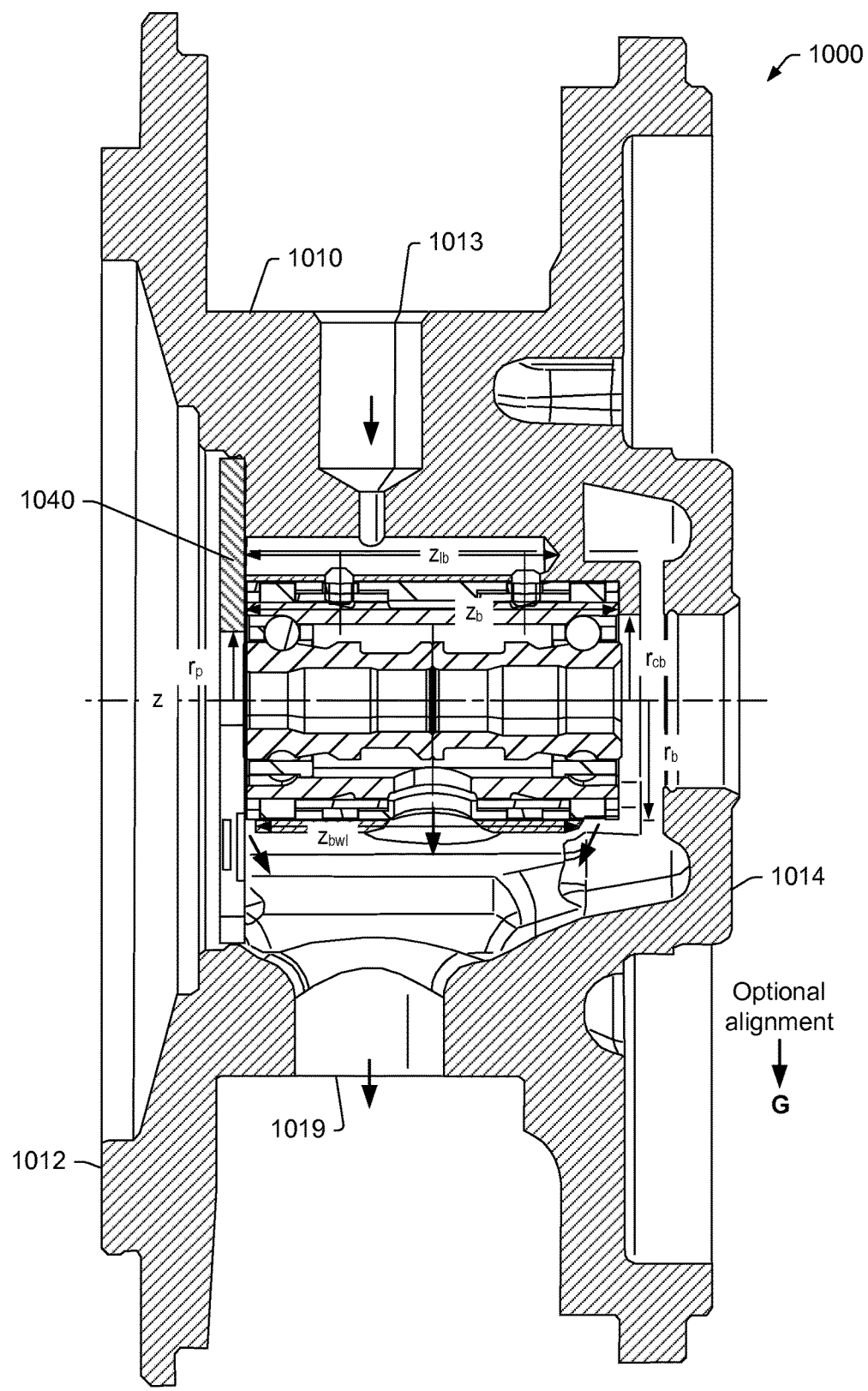
FIG. 11 is a cross-sectional view of the system of FIG. 10.

FIG. 11 is a cross-sectional view of the system 1000 of FIG. 10 where the plate 1040 is mounted to the housing 1010, for example, via one or more components and/or features such as bolts, threads, bayonet, etc.

As shown in the example of FIG. 11, the rolling element bearing unit 310 and the mixed-element damper assembly 301 may be axially located between the plate 1040 and a counter-bore of the housing 1010. For example, the plate 1040 may act to limit axial movement at the compressor side 1012 of the housing 1010 and the counter-bore may be a part of the housing 1010 that acts to limit axial movement toward the turbine side 1014 of the housing 1010. As an example, a clearance may exist where an axial dimension between the plate 1040 and a face of the counter-bore exceeds an axial dimension of the outer race 316 of the rolling element bearing unit 310 (e.g., and/or end surfaces of the end caps 330-1 and 330-2).

In the example of FIG. 11, various dimensions are shown, including a bore radius $r_b$, a counter-bore radius $r_{cb}$, a plate opening radius $r_p$, a bore length $z_b$, a lubricant passage length $z_{lb}$ and a lower bore wall length $z_{bwl}$, which may be dimensioned at a compressor end to form at least an axial clearance with respect to the plate 1040 and/or which may be dimensioned at a turbine end to form a contact with a radially outwardly extending lobe of a lobed-spring element. A direction of gravity is also shown, G, where the housing 1010 may be optionally substantially aligned therewith, for example, to facilitate drainage of lubricant where desirable.

Figure 12:
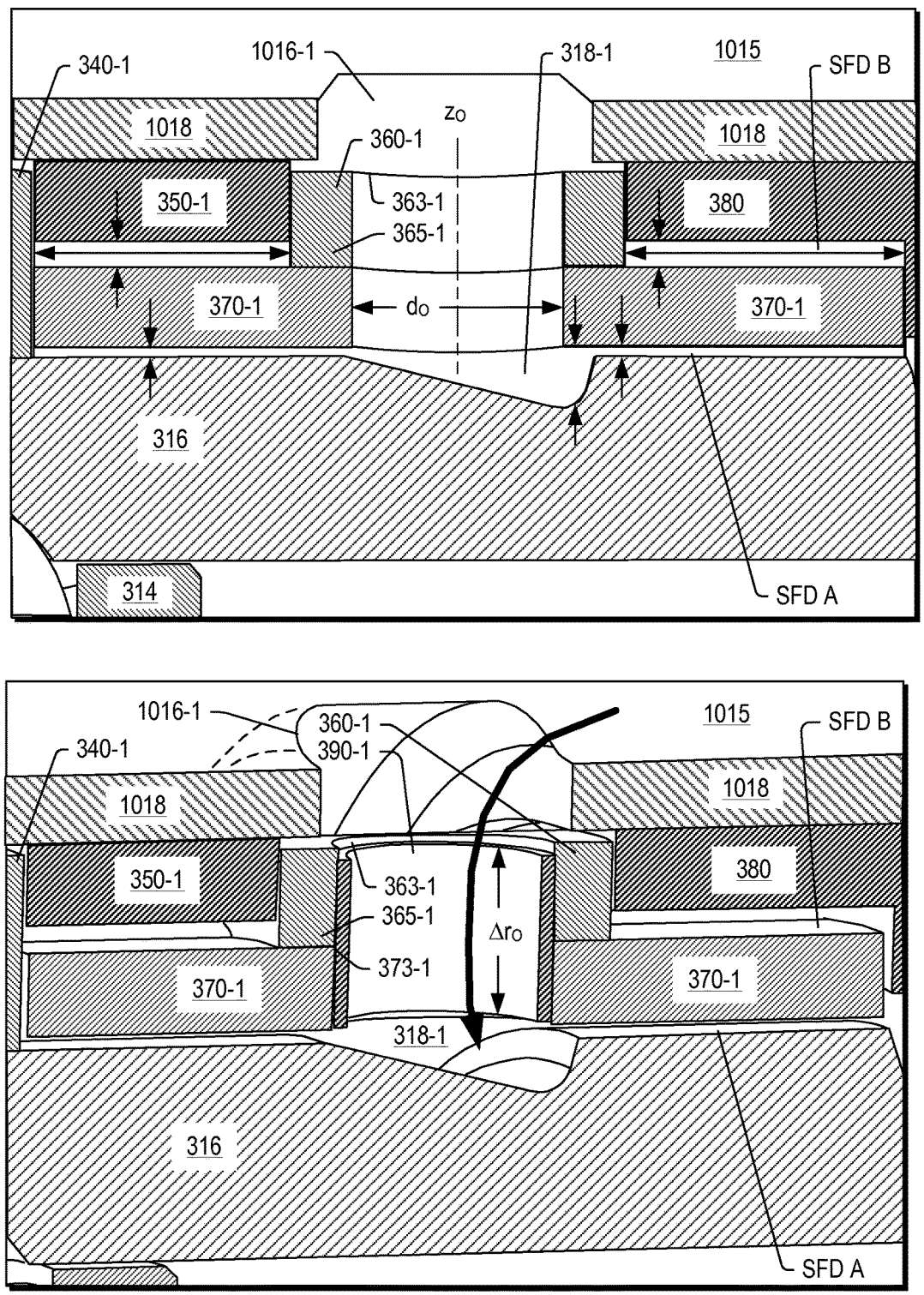
FIG. 12 is a series of cut-away views of a portion of the system of FIG. 10.

FIG. 12 shows a series of cut-away views of a portion of the system of FIG. 10. FIG. 12 shows both SFD A and SFD B types of squeeze film dampers (SFDs) where pressure of an SFD A type may exceed that of a SFD B type. FIG. 12 also shows a sleeve 390-1 that is disposed in the openings 363-1 and 373-1, for example, to provide for alignment, reduce leakage between the SFD ring element 370-1 and the lobed-spring element 360-1, etc. As shown, the opening 363-1 passes through a radially inwardly extending lobe 365-1 of the lobed-spring element 360-1. FIG. 12 also shows various dimensions or locations. For example, an axial location of an opening or passage is shown as $z_O$, where the passage can include a cross-sectional dimension $d_O$ and where a sleeve can include a radial height $\Delta r_O$. Various arrows are also shown in axial and radial directions, for example, corresponding to clearances where lubricant may flow, form films, etc.

Figure 13:
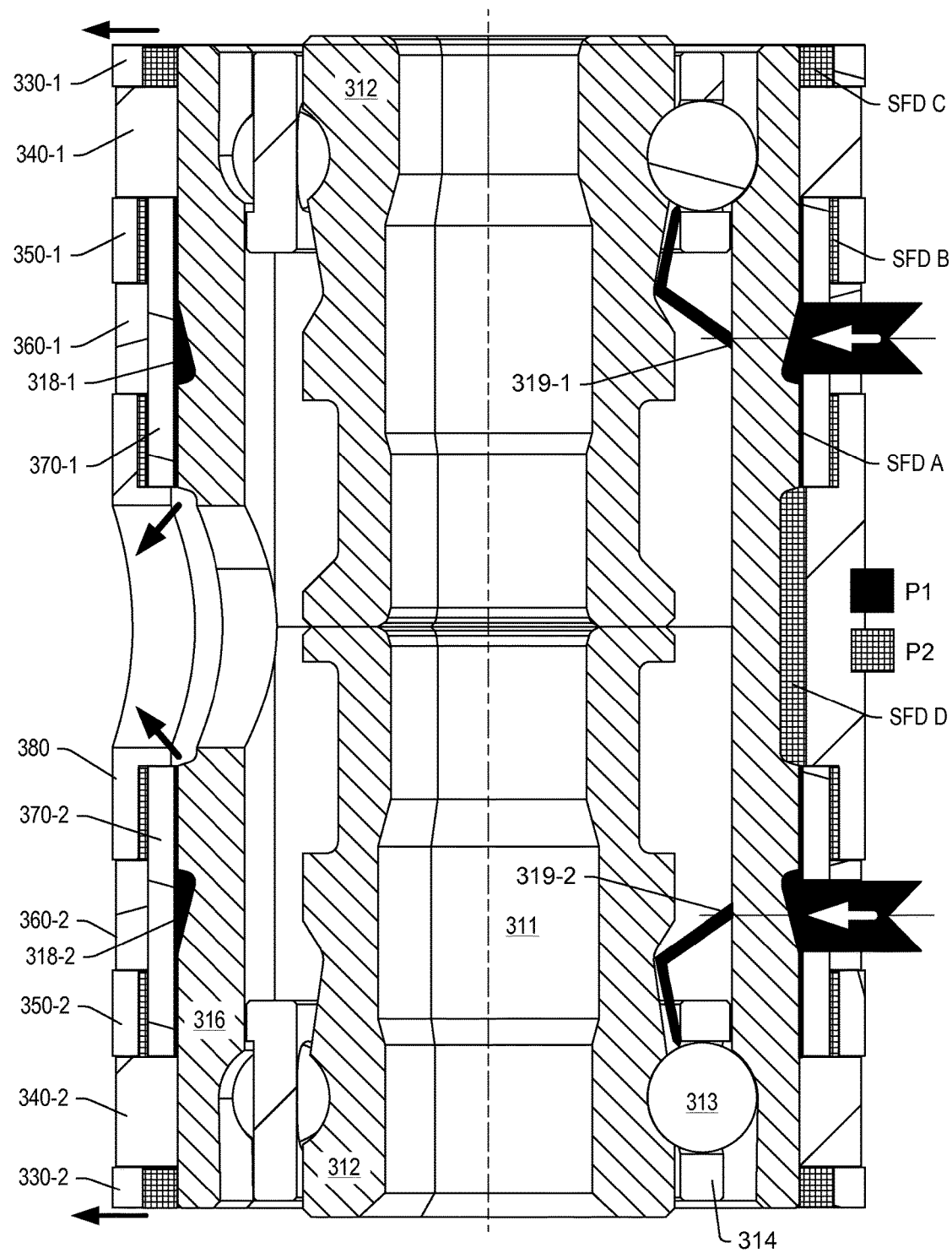
FIG. 13 is a cut-away view of the assembly of FIG. 6 that illustrates examples of lubricant passages.

FIG. 13 shows a cut-away view of the assembly 300 (see, e.g., FIG. 6) that illustrates examples of lubricant passages. A legend is also shown that identifies pressures P1 (e.g., a high or higher pressure range) and pressures P2 (e.g., a low or lower pressure range). Also shown are SFD A, SFD B, SFD C and SFD D, which extend at least in part azimuthally in a cylindrical coordinate system about an axis defined by the inner race 312 of the rolling element bearing unit 310.

TABLE 1

| Example Assembly | | |
| --- | --- | --- |
| Middle Spacer | Stainless Steel | 1 |
| Spring Spacer | Stainless Steel | 2 |
| End Cap T | Stainless Steel | 1 |
| End Cap C | Stainless Steel | 1 |
| Lobed-Spring Element $K_A$ | Titanium Alloy | 2 |
| Lobed-Spring Element $K_B$ | Titanium Alloy | 2 |
| SFD Ring Element | Stainless Steel | 2 |

As shown in Table 1, an example mixed-element assembly can include different materials of construction. In such an example, material of construction of a lobed-spring element may differ from that of a component or SFD element. For example, as a lobed-spring element may be subject to radial motions over one or more arc spans, a material of construction may be selected to provide for durability of such "spring action" (e.g., cycling, etc.).

As an example, a turbocharger system can include a housing that includes a bore defined at least in part by a bore wall; a rolling element bearing unit that includes an outer race; and a mixed-element damper assembly disposed at least in part between the outer race and the bore wall where the mixed-element damper assembly includes a lobed-spring element and a squeeze film damper element.

As an example, a lobed-spring element can include radially inwardly extending lobes and/or radially outwardly extending lobes.

As an example, a squeeze film damper element can be disposed at least in part radially between radially inwardly extending lobes of a lobed-spring element and an outer race (e.g., an outer surface of an outer race).

As an example, radially outwardly extending lobes of a lobed-spring element can contact a bore wall of a housing.

As an example, a turbocharger system can include a mixed-element damper assembly that includes at least two lobed-spring elements. In such an example, at least two of the two lobed-spring elements can differ in lobe shape of radially inwardly extending lobes.

As an example, a squeeze film damper element can be a squeeze film damper ring element (e.g., including at least one continuous 360 degree portion). As an example, a squeeze film damper element can include a lubricant opening, for example, to allow for passage of lubricant to a rolling element bearing unit.

As an example, a squeeze film damper element can define a low pressure squeeze film space and a high pressure squeeze film space. In such an example, lubricant may be provided to such spaces to form squeeze film dampers, which may differ in their damping due at least in part to pressure (e.g., lubricant pressure).

As an example, a mixed-element damper assembly can include keys and keyways that orient a lobed-spring element with respect to a squeeze film damper element.

As an example, a mixed-element damper assembly can include an end cap that is coupled to a lobed-spring element, which may be coupled to a spacer that may be coupled to another lobed-spring element. In such an example, another spacer may be included that is coupled to the other lobed-spring element.

As an example, a lobed-spring element and a squeeze film damper element can be compressor side elements and a mixed-element damper assembly can include another lobed-spring element and another squeeze film damper element that can be turbine side elements.

As an example, a mixed-element damper assembly can include a lobed-spring element and a squeeze film damper element act in series (e.g., as a spring and a dashpot in series). In such an example, another lobed-spring element can be included that acts in parallel to the in series elements (e.g., a spring that is parallel to a spring and dashpot that are in series).

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbocharger system comprising:
a housing that comprises a bore defined at least in part by a bore wall;
a rolling element bearing unit that comprises an outer race; and
a mixed-element damper assembly disposed at least in part between the outer race and the bore wall wherein the mixed-element damper assembly comprises a lobed-spring element and a squeeze film damper element and wherein the squeeze film damper element comprises a squeeze film damper ring element.

2. The turbocharger system of claim 1 wherein the lobed-spring element comprises radially inwardly extending lobes.

3. The turbocharger system of claim 2 wherein the squeeze film damper element is disposed at least in part radially between the radially inwardly extending lobes and the outer race.

4. The turbocharger system of claim 1 wherein the lobed-spring element comprises radially outwardly extending lobes.

5. The turbocharger system of claim 4 wherein the lobed-spring element comprises radially inwardly extending lobes.

6. The turbocharger system of claim 4 wherein the radially outwardly extending lobes contact the bore wall.

7. The turbocharger system of claim 1 comprising at least two lobed-spring elements.

8. The turbocharger system of claim 7 wherein at least two of the two lobed-spring elements differ in lobe shape of radially inwardly extending lobes.

9. The turbocharger system of claim 1 wherein the squeeze film damper element comprises a lubricant opening.

10. The turbocharger system of claim 1 wherein the squeeze film damper element defines a low pressure squeeze film space and a high pressure squeeze film space.

11. The turbocharger system of claim 1 wherein the mixed-element damper assembly comprises keys and keyways that orient the lobed-spring element with respect to the squeeze film damper element.

12. The turbocharger system of claim 1 comprising an end cap that is coupled to the lobed-spring element that is coupled to a spacer that is coupled to another lobed-spring element.

13. The turbocharger system of claim 12 comprising another spacer that is coupled to the other lobed-spring element.

14. The turbocharger system of claim 1 wherein the lobed-spring element and the squeeze film damper element comprise compressor side elements and further comprising another lobed-spring element and another squeeze film damper element that comprise turbine side elements.

15. The turbocharger system of claim 1 wherein the lobed-spring element and the squeeze film damper element act in series.

16. The turbocharger system of claim 15 comprising another lobed-spring element that acts in parallel to the in series elements.

17. A turbocharger system comprising:
a housing that comprises a bore defined at least in part by a bore wall;
a rolling element bearing unit that comprises an outer race; and
a mixed-element damper assembly disposed at least in part between the outer race and the bore wall wherein the mixed-element damper assembly comprises a lobed-spring element and a squeeze film damper element and wherein the squeeze film damper element defines a low pressure squeeze film space and a high pressure squeeze film space.

18. A turbocharger system comprising:
a housing that comprises a bore defined at least in part by a bore wall;
a rolling element bearing unit that comprises an outer race; and
a mixed-element damper assembly disposed at least in part between the outer race and the bore wall wherein the mixed-element damper assembly comprises a lobed-spring element and a squeeze film damper element and wherein the mixed-element damper assembly comprises keys and keyways that orient the lobed-spring element with respect to the squeeze film damper element.

19. A turbocharger system comprising:

a housing that comprises a bore defined at least in part by a bore wall;

a rolling element bearing unit that comprises an outer race; and a mixed-element damper assembly disposed at least in part between the outer race and the bore wall wherein the mixed-element damper assembly comprises a lobed-spring element and a squeeze film damper element and wherein the lobed-spring element and the squeeze film damper element act in series.

20. The turbocharger system of claim 19 comprising another lobed-spring element that acts in parallel to the in series elements.

* * * * *